(12) United States Patent
Uchikawa

(10) Patent No.: US 8,867,536 B2
(45) Date of Patent: Oct. 21, 2014

(54) COMMUNICATION APPARATUS CONDITIONAL NOTIFICATION DESTINATION REGISTRATION

(75) Inventor: Shinichi Uchikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 210 days.

(21) Appl. No.: 13/235,601

(22) Filed: Sep. 19, 2011

(65) Prior Publication Data

US 2012/0011279 A1   Jan. 12, 2012

Related U.S. Application Data

(63) Continuation of application No. 11/736,120, filed on Apr. 17, 2007, now Pat. No. 8,040,881.

(30) Foreign Application Priority Data

Apr. 17, 2006   (JP) ................................ 2006113746

(51) Int. Cl.
*H04L 12/28*   (2006.01)
*H04L 12/66*   (2006.01)
*H04L 29/12*   (2006.01)

(52) U.S. Cl.
CPC ........... *H04L 12/66* (2013.01); *H04L 29/12066* (2013.01)
USPC ...... 370/389; 370/328; 370/254; 370/395.54; 709/218

(58) Field of Classification Search
CPC .................................................... H04L 12/28

USPC .......................................................... 370/389
See application file for complete search history.

(56) References Cited

U.S. PATENT DOCUMENTS

| | | | |
|---|---|---|---|
| 6,389,462 B1 * | 5/2002 | Cohen et al. ................... | 709/218 |
| 7,188,138 B1 * | 3/2007 | Schneider ..................... | 709/203 |
| 8,040,881 B2 * | 10/2011 | Uchikawa ..................... | 370/389 |
| 2003/0177236 A1 | 9/2003 | Goto et al. | |
| 2003/0236779 A1 | 12/2003 | Choi et al. | |
| 2004/0047349 A1 * | 3/2004 | Fujita et al. ................... | 370/389 |
| 2005/0015644 A1 * | 1/2005 | Chu et al. .......................... | 714/4 |
| 2005/0036491 A1 * | 2/2005 | Ogawa et al. ............... | 370/395.2 |
| 2005/0226180 A1 * | 10/2005 | Devarapalli et al. .......... | 370/328 |
| 2006/0005044 A1 * | 1/2006 | Uchikawa ..................... | 713/189 |
| 2006/0031536 A1 | 2/2006 | Eydelman et al. | |
| 2007/0242623 A1 | 10/2007 | Uchikawa | |
| 2008/0046597 A1 | 2/2008 | Stademann et al. | |

FOREIGN PATENT DOCUMENTS

JP   2004-088428 A   3/2004

* cited by examiner

*Primary Examiner* — Ayaz Sheikh
*Assistant Examiner* — Hai-Chang Hsiung
(74) *Attorney, Agent, or Firm* — Rossi, Kimms & McDowell LLP

(57) ABSTRACT

When a destination address specified by a client is to be registered as a destination, determination is made as to whether name resolution of the destination address is possible or not. If it is determined that name resolution is impossible, registration of the destination address that requires name resolution is restricted.

6 Claims, 8 Drawing Sheets

FIG. 8

SELECT DESTINATION

*DESTINATION LIST

| NAME | ADDRESS |
|---|---|
| A | 172.24.160.232 |
| B | dev1.eanon.co.jp |
| C | dev2.eanon.co.jp |
| D | dev3.eanon.co.jp |
| E | 172.24.162.102 |
| F | 172.24.176.3 |
| G | 172.24.176.34 |
| H | pc1.eanon.co.jp |

CANCEL    OK

305

COMMUNICATION APPARATUS CONDITIONAL NOTIFICATION DESTINATION REGISTRATION

This is a continuation of and claims priority from U.S. patent application Ser. No. 11/736,120 filed Apr. 17, 2007, the content of which is incorporated herein by reference.

BACKGROUND OF THE INVENTION

1. Field of the Invention

The present invention relates to a communication apparatus that communicates with a destination indicated by registered destination data and to a control method of the apparatus.

2. Description of the Related Art

A communication apparatus that performs name resolution in which a Domain Name System (DNS) is used to obtain an IP address corresponding to a name is known (see Japanese Patent Laid-Open No. 2004-88428). The communication apparatus asks a DNS server for an IP address corresponding to destination data specified by a user, for example "host.xxx-.co.jp", to obtain the IP address (for example, "192.10.0.1").

For a system that has destination data (for example, "host.abc.co.jp") registered in itself and communicates with the destination indicated by the registered destination data, the system can be in a state where name resolution is not enabled. Conventionally, registration of FQDN name destination data that requires name resolution has been permitted in such a system even if the system is in a state where name resolution is not enabled. An FQDN (Fully Qualified Domain Name) is a description format, in a TCP/IP network environment that describes a full name starting with a host name and continues up to a domain name.

Since even destination data that requires name resolution is registered in a communication apparatus in a state where name resolution is not enabled, memory areas of the apparatus are wasted. For example, registering destination data in an FQDN representation with which communication cannot be performed in a system that can register only a limited amount of destination data is obviously a waste of memory resources. Furthermore, if useless destination data is stored, then the upper limit of the number of pieces of destination data registered can be reached and other destination data cannot be registered. Even if there are no limits on the number of pieces of destination data registered, a user can mistakenly select a destination from registered destination data that requires name resolution and with which communication is impossible in a state where name resolution is not enabled and can perform useless operations.

SUMMARY OF THE INVENTION

An object of the present invention is to solve the problem with the conventional art.

A feature of the present invention is the capability of preventing the use of destination data that cannot be used for communication.

According to an aspect of the present invention, there is provided a communication apparatus comprising:

a registration unit configured to register destination data that is necessary to obtain an address on a network based on the destination data;

a determination unit configured to determine whether or not an address on a network that corresponds to destination data that is necessary to obtain an address on a network based on the destination data can be obtained from the destination data; and a registration restriction unit configured to, in a case where the determination unit determines that an address on a network cannot be obtained from the destination data, restrict registration of destination data that is necessary to obtain an address on a network based on the destination data.

Further, according to an aspect of the present invention, there is provided a control method used in a communication apparatus, comprising:

a registration step of registering destination data that is necessary to an address on a network based on the destination data;

a determination step of determining whether or not an address on a network that corresponds to destination data that is necessary to obtain the address on the network based on the destination data can be obtained from the destination data; and wherein, in a case where it is determined in the determination step that an address on a network cannot be obtained based on the destination data, registration of the destination data that is necessary to obtain an address on a network from the destination data is restricted in the registration step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view illustrating an example of a destination list screen displayed on a display unit of a console unit in a state where the setting of DNS is removed according to the embodiment.

DESCRIPTION OF THE EMBODIMENTS

The preferred embodiments of the present invention will be described below in detail with reference to the accompanying drawings. The following embodiments do not limit the claims of the present invention, and not all combinations of features described in the embodiments are essential in solving means of the present invention.

Features of an embodiment of the present invention will be described below.

According to an embodiment, if a system is in a state in which name resolution is impossible (for example, when DNS is not set in the system), the system does not accept a registration request of destination data represented by an FQDN and generates an error. This can prevent registration of useless destinations with which communication is impossible in the current state and constrain wasteful use of memory for registration. This can also prevent destinations with which communication is impossible but yet have been registered from being mistakenly selected.

In a case that the system according to the present embodiment receives a request for connecting with a destination represented by an FQDN when the system is in a state where name resolution is impossible (for example when DNS is not set in the system), the system immediately generates a name resolution error without attempting to establish the connection. Thus, useless transmission processing for destinations to which data cannot be transmitted can be avoided.

Furthermore, according to the embodiment, if the DNS setting in a system is changed, the system notifies invalidity of event notification (expiration of event notification) to destinations registered using FQDN name among the destinations where event notification is registered in the system. In addition, the destination data is also deleted. This prevents a client registered as a notification destination of the event from waiting for receiving an event notification without knowing that the event notification has been cancelled. If the client wants the event notification, the client sends to the system a destination address (IP address) that does not require name resolution to register it as an event notification destination. In this way, the client can be re-registered as a notification destination of an event notification. A specific example will be described below.

Figure 1:
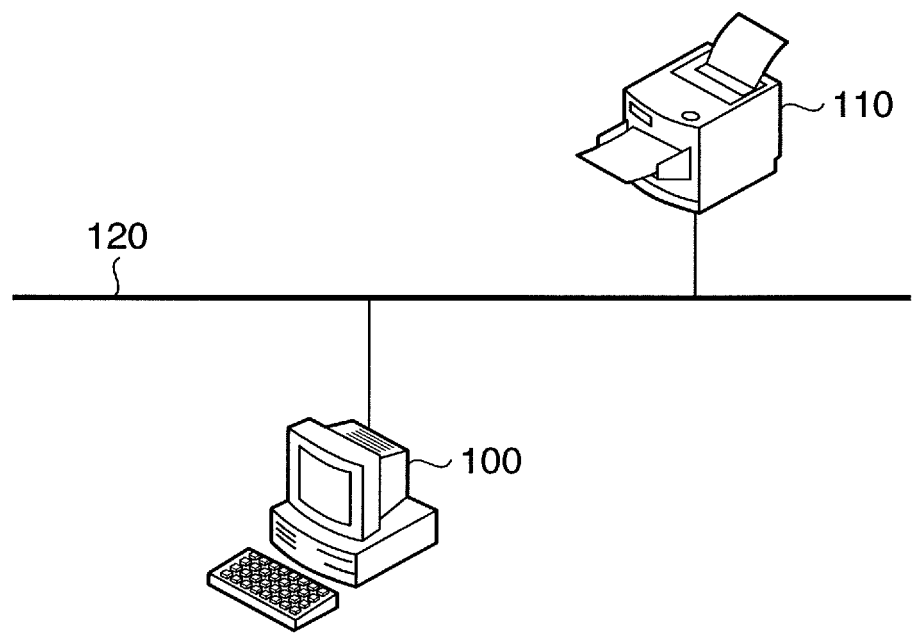
FIG. 1 is a diagram showing an exemplary system configuration illustrative of a destination management system according to an embodiment of the present invention.

FIG. 1 depicts a view illustrating an exemplary system configuration illustrative of a destination management system according to an embodiment of the present invention.

The system includes a client terminal 100 and a device 110 that includes a destination management system. The client terminal 100 registers destination data indicating a destination of data communication in the device 110 through a network 120. The destination data contains data such as an IP address or an FQDN. The device 110 including the destination management system provides the functions of registering destination data specified through an input unit of the device 110 and registering destination data specified from the client terminal 100 over the network 120.

Figure 2:
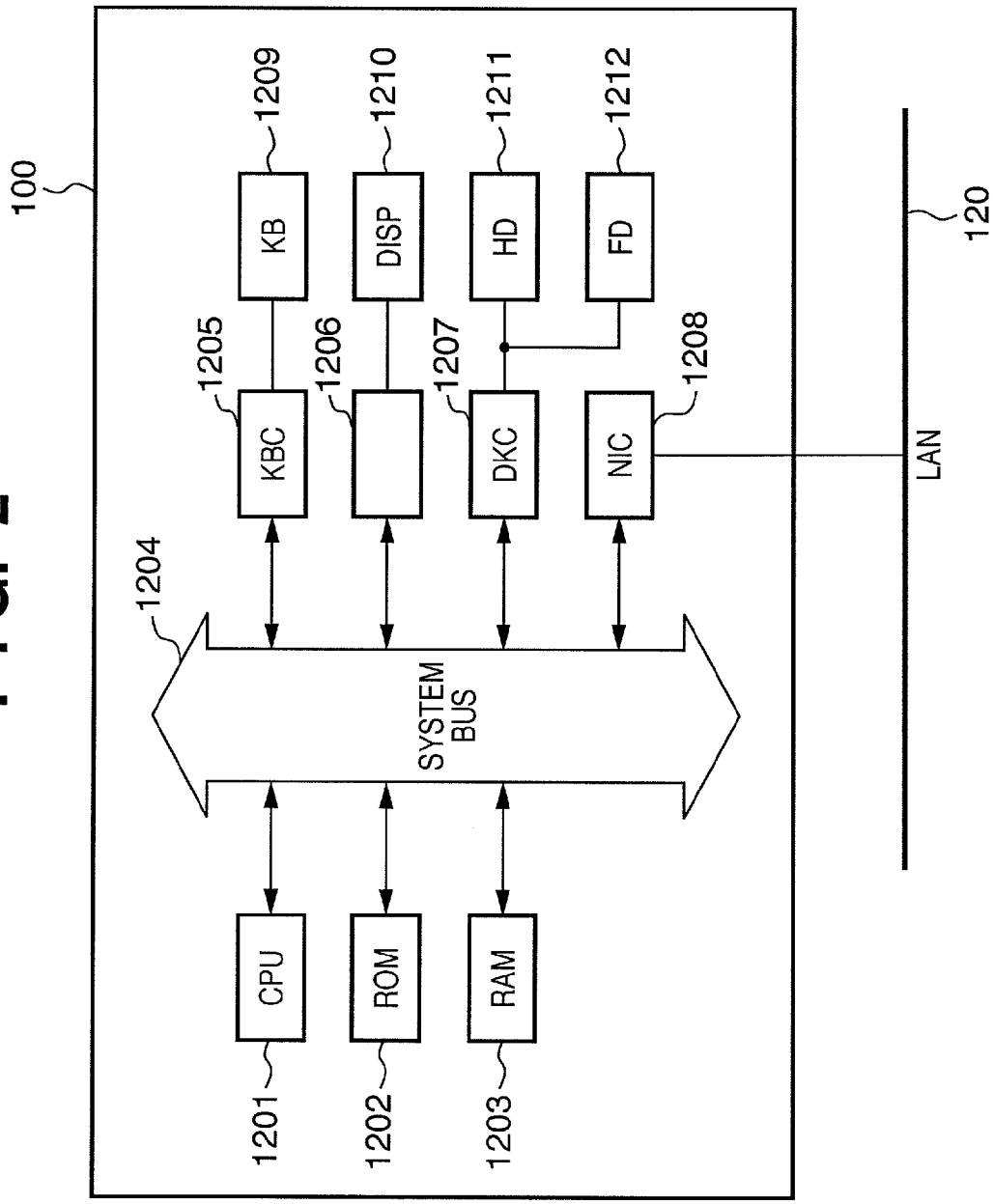
FIG. 2 depicts a view illustrating an exemplary hardware configuration of a client terminal according to the embodiment.

FIG. 2 depicts a view illustrating an exemplary hardware configuration of a client terminal 100 according to the present embodiment. The client terminal 100 has the same configuration as that of a typical PC.

The client terminal has a CPU 1201 which executes various software programs stored in a ROM 1202 or hard disk (HD) 1211 or provided from a floppy (R) disk drive (FD) 1212. The CPU 1201 centrally controls components connected onto a system bus 1204. A RAM 1203 functions as the main memory and work area of the CPU 1201. A keyboard controller (KBC) 1205 controls input of instructions from input devices such as a keyboard (KB) 1209 and a pointing device (not shown). A display controller 1206 controls display on a display unit (DISP) 1210.

A disk controller (DKC) 1207 controls access to the HD 1211 and the FD 1212 which store a distributed server system program, various applications, edit files, user files and other data. A network interface card (NIC) 1208 communicates data to and from a network printer and other network devices or other PCs through a LAN 120.

Figure 3:
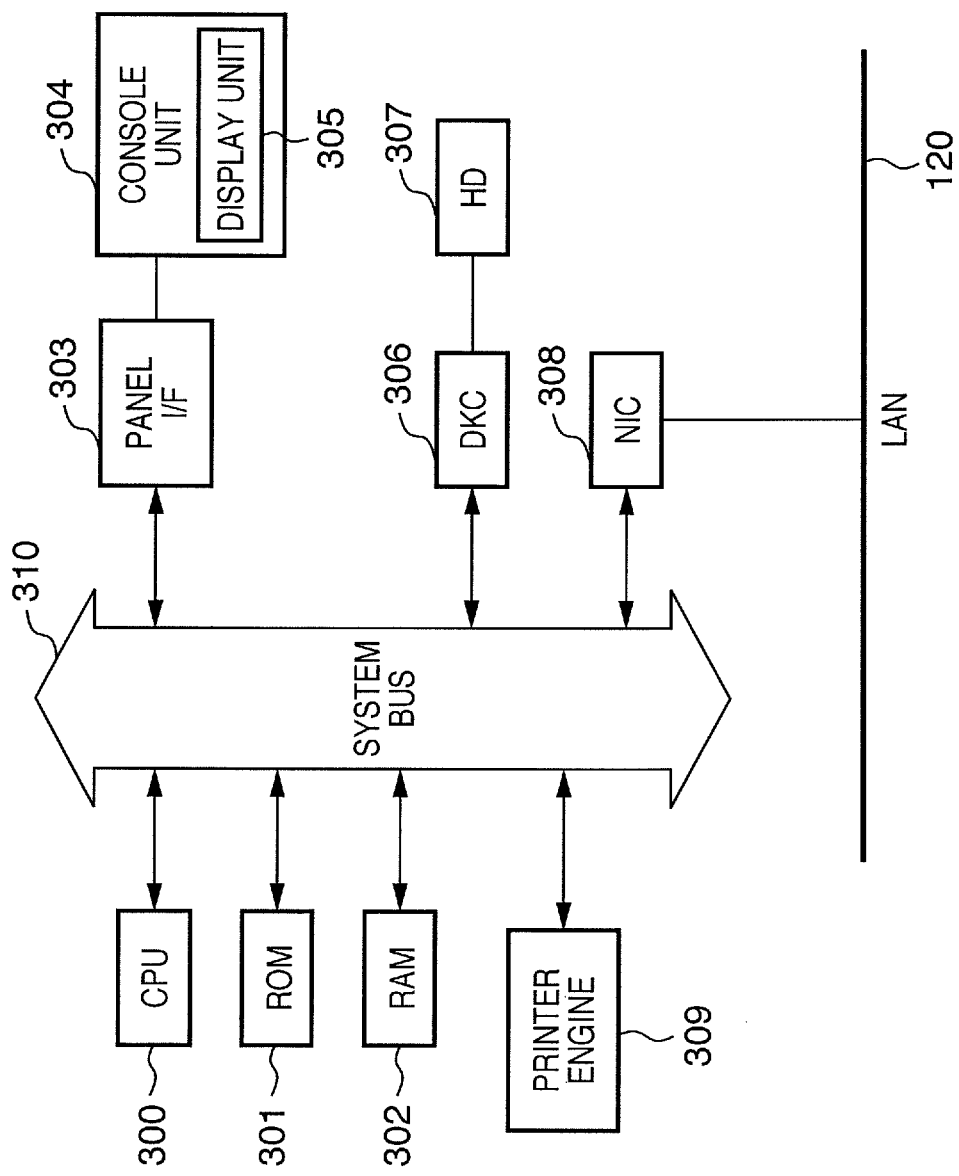
FIG. 3 depicts a view illustrating an exemplary hardware configuration of a device including a destination management system according to the embodiment.

FIG. 3 depicts a view illustrating an exemplary hardware configuration of the device 110 including the destination management system according to the embodiment. The device 110 is a printer in this example.

A CPU 300 executes various software programs stored in a ROM 301 or a hard disk (HD) 307. The CPU 300 centrally controls components connected onto a system bus 310. A RAM 302 functions as the main memory and work area of the CPU 300. A panel interface 303 controls input and output of instructions from a console unit 304 having a display unit 305, various keys and operation buttons. A disk controller (DKC) 306 controls access to the HD 307 storing a distributed server system program, various applications, edit files, user files and other data. A network interface card (NIC) 308 communicates data to and from the client terminal 100 described above, other network devices, or PCs through a LAN 120. Numeral 309 denotes a printer engine for printing an image on a sheet.

Figure 4:
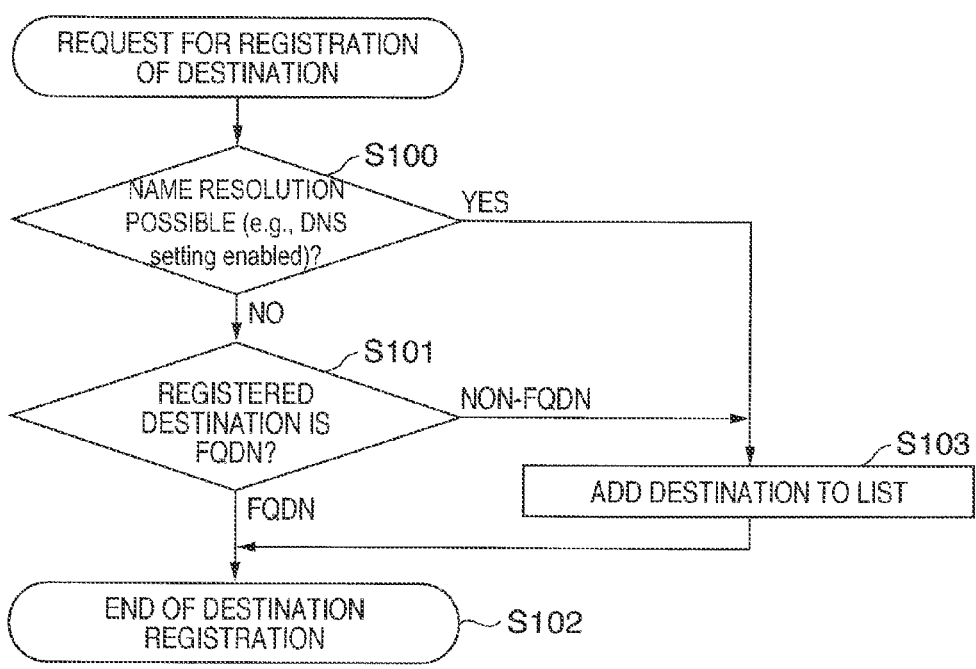
FIG. 4 is a flowchart illustrating a process for registering a destination in a device according to the embodiment in response to a request from a client.

FIG. 4 is a flowchart illustrating a process for registering destination data in a destination list on the device 110 according to the embodiment in response to a request from the client terminal 100. A program that performs the process is loaded in the RAM 302 when executing the process and is executed under the control of the CPU 300.

The process is activated in response to a request for registering a destination sent from the client terminal 100. First, the device 110 determines in step S100 whether name resolution is possible. If the device 110 determines that name resolution is possible, the process proceeds to step S103, where the device 110 registers destination data specified by the client terminal 100 in a destination list and notifies the client terminal 100 that the destination data has been successfully registered. When data communication is actually performed, the device 110 uses a DNS to obtain an address on a network, for example an IP address, that corresponds to the destination data and performs data communication based on the IP address if the destination data selected as the destination of data communication requires name resolution.

On the other hand, if the device 110 determines in step 100 that name resolution is impossible, the process proceeds to step S101, where the device 110 determines whether the destination data specified in the registration request is an FQDN name, that is, destination data that requires name resolution. If the device 110 determines that the destination data requires name resolution, the process proceeds to step S102 and the device 110 ends the process without registering the destination data. The device 110 notifies the client terminal 100 that has requested for registration of the destination that the registration of the destination data has failed because of a name resolution error.

On the other hand, if the device 110 determines in step S101 that the destination data specified in the registration request from the client is not an FQDN name, that is, destination data that does not require name resolution, the process proceeds to step S103, where the device 110 registers the specified destination data in the destination list. One example of destination data that is not an FQDN name and does not require name resolution is an IP address. The device 110 notifies the client terminal 100 that the destination data has been successfully registered.

Figure 5:
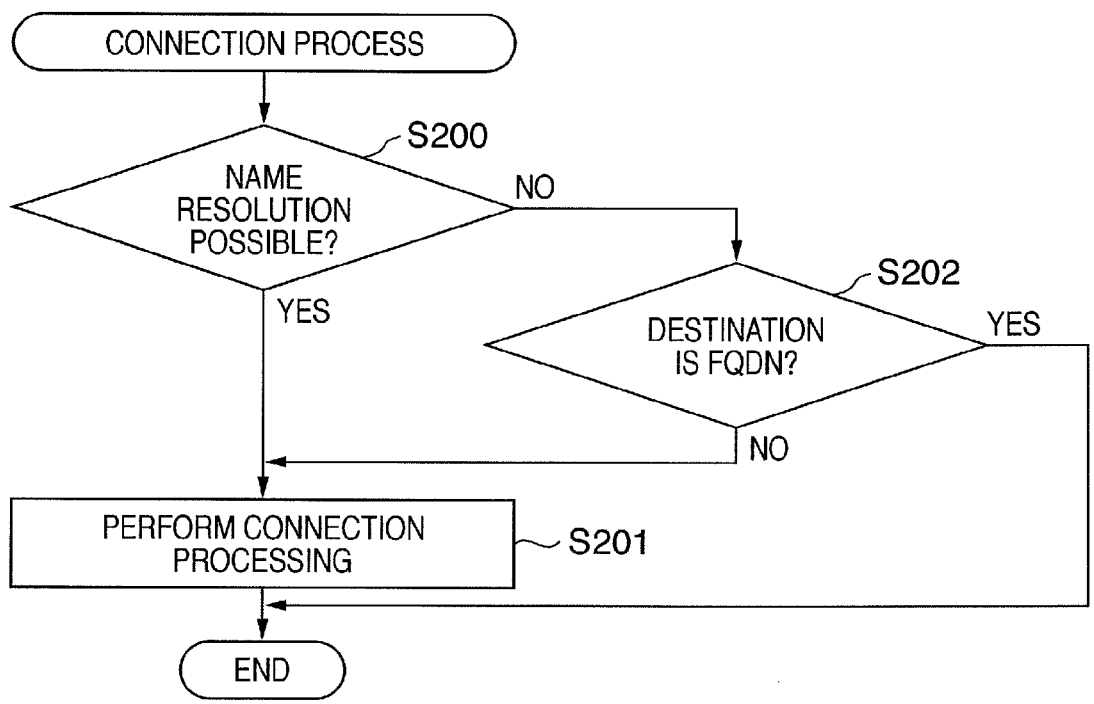
FIG. 5 is a flowchart illustrating a process for establishing connection with a registered destination in a device according to the embodiment.

FIG. 5 is a flowchart illustrating a process for establishing connection to the destination indicated by destination data registered in a destination list. When the process is executed, a program that performs the process is loaded into the RAM 302 and is executed under the control of the CPU 300.

This process is, for example, activated by processing for establishing a connection to the destination indicated by destination data registered in a destination list in response to the occurrence of an event. First, the device 110 determines in step S200 whether name resolution is possible. If possible, the process proceeds to step S201, where processing for establishing connection to the destination indicated by the registered destination data is performed.

On the other hand, if the device 110 determines in step S200 that name resolution is impossible, the process proceeds to step S202, where the device 110 determines whether the destination data is an FQDN name, that is, destination data that requires name resolution. If the device 110 determines that the destination data requires name resolution, the device 110 generates a connection error and aborts the process because the name resolution is impossible. On the other hand, if the device 110 determines in step S202 that the destination data does not require name resolution, the process proceeds to step S201, where the device 110 performs processing for establishing connection to the destination indicated by the destination data.

Figure 6:
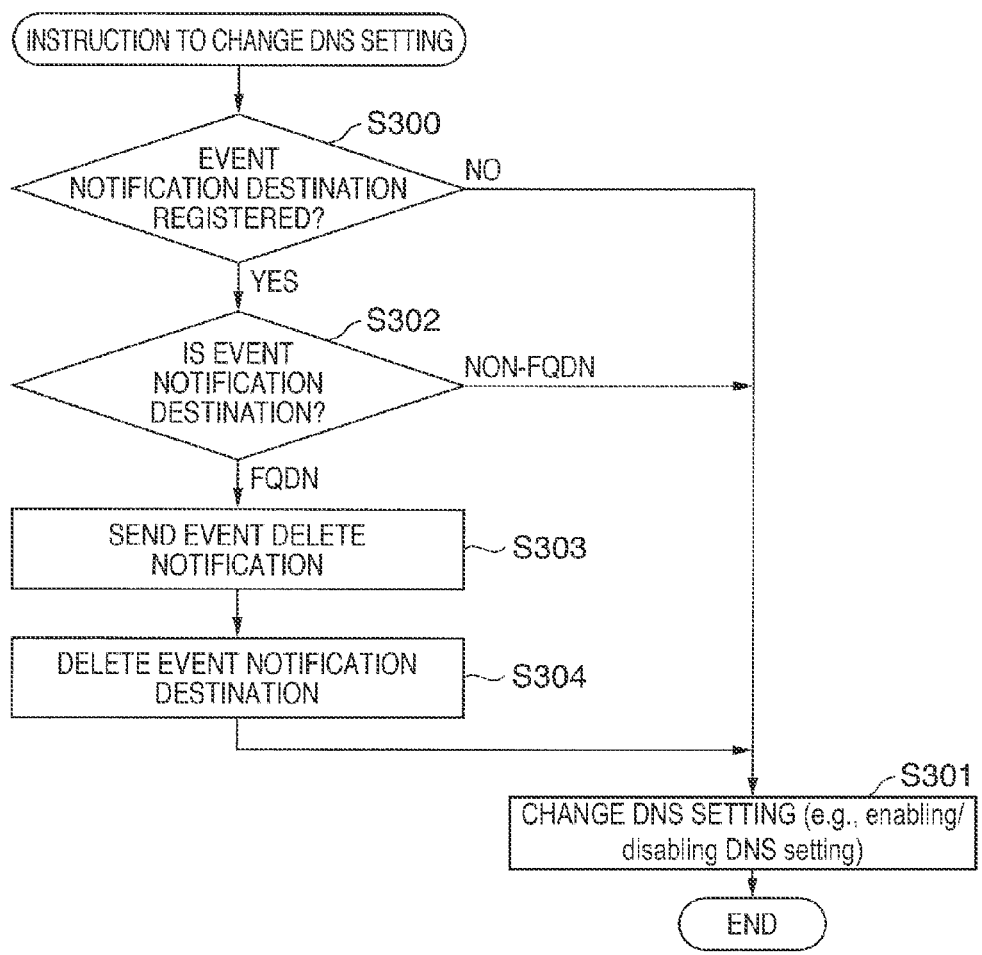
FIG. 6 is a flowchart illustrating a process for changing the DNS setting in a device according to the embodiment.

FIG. 6 is a flowchart illustrating a process for changing the DNS setting on the device 110 according to the present embodiment. When the process is to be executed, a program performing the process is loaded into the RAM 302 and executed under the control of the CPU 300.

When an instruction to change the DNS setting is issued, the device 110 first determines in step S300 whether there is destination data registered as an event notification destination. If present, the process proceeds to step S302, where the device 110 determines whether the destination data of the event notification destination is an FQDN name, that is, whether name resolution is required. If name resolution is required, the process proceeds to step S303, where the device 110 notifies the registered event notification destination of deletion of the event. Then, in step S304, the device 110 deletes the destination data of the registered event notification destination. Then the process proceeds to step S301, where the device 110 performs processing for making change of the specified DNS setting.

If there is not an event notification destination in step S300 or if the destination data of the event notification destination is not an FQDN in step S302, the process proceeds to step S301, where the device 110 performs processing for changing the specified DNS setting. These DNS setting changes include changing of a DNS server and changing to not use DNS itself.

It should be noted that the device 110 may reject registration of new destination data during this process because the DNS setting is being changed.

Figure 7:
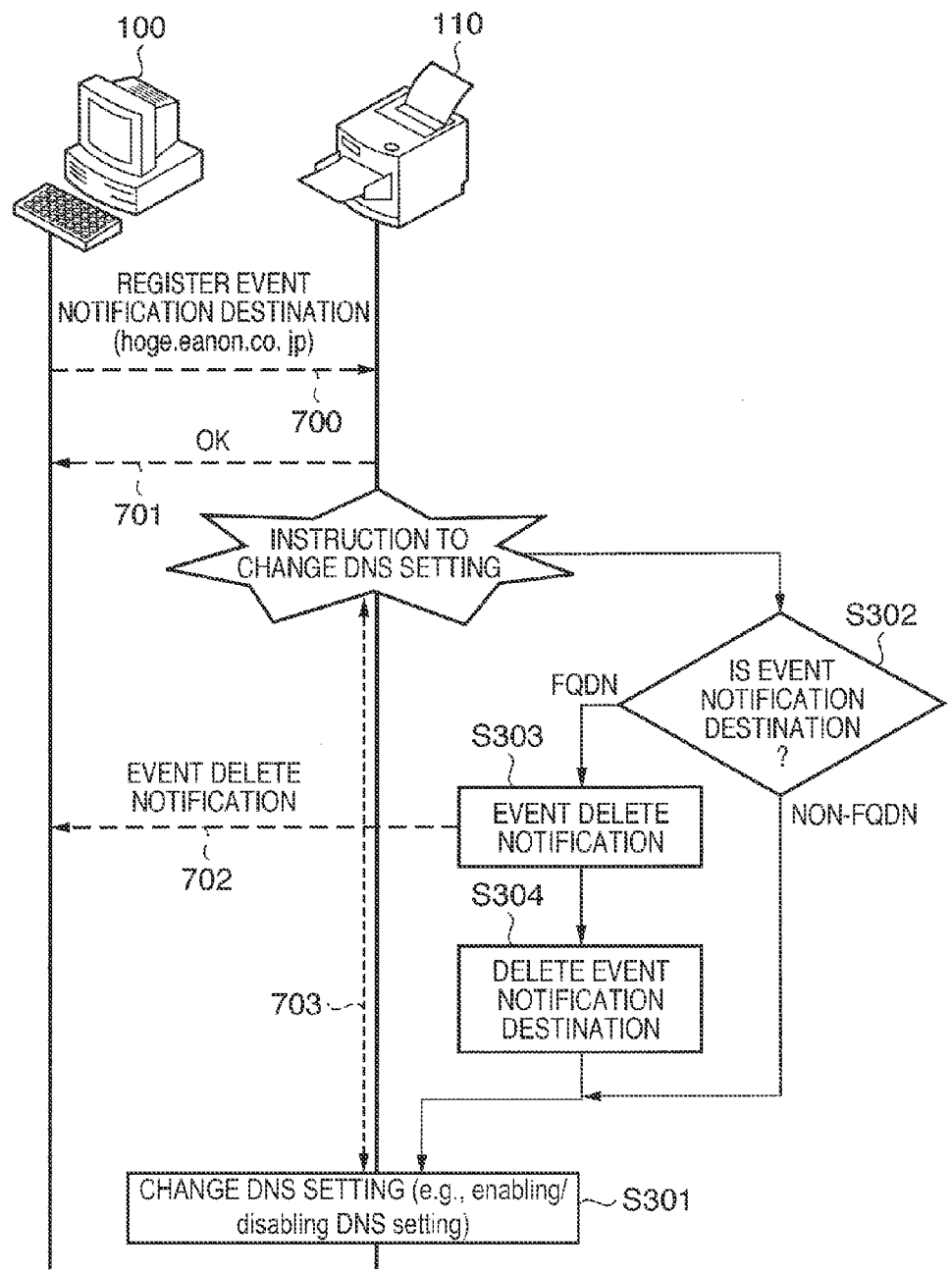
FIG. 7 is a supplementary diagram illustrating a DNS change sequence in a destination management system according to the embodiment.

FIG. 7 is a supplementary diagram illustrating a DNS change sequence performed in a destination management system according to the present embodiment. Shown in FIG. 7 is the relation of the operation between a client terminal 100 and a device 110 when there is event registration and the DNS setting is changed. The same steps (S301 to S304) that are in the flowchart of FIG. 6 are labeled with the same reference numerals.

The client terminal 100 attempts to register in the device 110 destination data which is an FQDN name (700) as an event notification destination. If the device 110 returns OK in response to that, the client terminal 100 is registered as an event notification destination (701).

When an instruction to change DNS settings on the device is issued, the device 110 checks destination data registered as the event notification destinations (S302). The client terminal 100 has destination data that is an FQDN name as its notification destination. Therefore, the device 110 determines that the registered destination data is an FQDN name and proceeds to step S303, where the device 110 sends notification of deletion of an event to the destination indicated by the registered destination data (702). After sending the notification, the device 110 deletes the destination data of the destination to which it has sent the notification of the event deletion from the list of event notification destinations (S304). The device 110 then sets the specified DNS setting in itself and enables the new DNS setting (S301). In the new DNS setting, a new DNS server may be set or DNS may be disabled.

It should be noted that the DNS setting is being changed during the period (703) between reception of an instruction to change the DNS setting and the completion of change to the new DNS settings. Accordingly, if a request for registering destination data is received during this period, it is unknown whether the name resolution of the destination data is possible. Therefore, registration of new destination data may be rejected during this period.

At numeral 702 in FIG. 7, the client terminal 100 receives the event delete notification and can determine from the event deletion notification that the event has been deleted because the DNS setting has been changed. The client terminal 100 performs processing again for requesting registration of destination data as an event notification destination at a timing when the device 110 is likely to have completed the change of the DNS settings. Thus, the client terminal 100 can reissue a request for registering destination data that is an FQDN as an event notification destination to the device 110 to register the destination data.

FIG. 8 depicts a view illustrating an example of a destination list screen displayed on the display unit 305 of the console unit 304 according to the present embodiment. In the example shown, DNS has been disabled.

Upon displaying the list of the registered destination data, destinations registered using FQDN names are grayed out because data communication with those destinations is impossible. Data cannot be sent to the destinations with the names "B", "C", "D", and "H" in the example in FIG. 8 because their destination data are FQDN names. Therefore characters of these destinations are grayed out.

(Other Modes)

An embodiment of the present invention has been described in detail. The present invention can be applied to a system consisting of multiple devices or to an apparatus consisting of a single device.

It should be noted that the present invention can be embodied as an implementation in which a software program that implements the functions of the embodiment described above is provided to a system or apparatus directly or remotely and the program is read and executed by a computer of the system or apparatus. The implementation does not need to be a program as long as it has the capability of a program.

Therefore, the program code installed in a computer in order to implement the functions and processing of the present invention on the computer also implements the present invention. In other words, the claims of the present invention also include a computer program for implementing the functions and processing of the present invention. The computer program may be a program in any form that has the capability of a program, such as an object code, a program executed by an interpreter, and script data to be provided to an operating system.

The program can be provided on any of various recording media, such as a floppy (R) disk, hard disk, optical disc, magneto-optical disk (MO), CD-ROM, CD-R, CD-RW, magnetic tape, non-volatile memory card, ROM, and DVD (including DVD-ROM and DVD-R).

The program can also be provided to a client computer by connecting to a Web page on the Internet through a browser of the client computer and downloading the computer program from the Web page to a recording medium such as a hard disk. The program downloaded may be a computer program of the present invention or may be a compressed file including an automatic install function. Furthermore, the program code constituting the computer program of the present invention may be divided into files and the files may be downloaded from different Web pages. In other words, a WWW server, from which a number of users can download the program file that implements the functions and processing of the present invention on computers, also falls within the scope of the present invention.

The computer program of the present invention may be delivered to users in encrypted form on a storage medium such as a CD-ROM. In that case, users who meet predetermined requirements are allowed to download key information for decrypting the program from a Web page through the Internet and the users use the key information to install the encrypted program in an executable format in a computer.

The present invention can also be implemented in a mode other than the above-described modes in which a computer reads and executes the program to implement functions of any of the embodiments described above. For example, an operating system or the like running on a computer may perform part or all of actual processing according to instructions in the program to implement functions of any of the embodiments described above.

Furthermore, the program read from a recording medium may be written in a memory provided in an extension board inserted into a computer or an extension unit connected to a computer. Then, a CPU or the like in the extension board or extension unit performs part or all of actual processing to implement functions of any of the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-113746, filed Apr. 17, 2006, which is hereby incorporated by reference herein in its entirety.

What is claimed is:

1. A communication apparatus comprising:
a receiving unit configured to receive a notification destination that is to be notified in response to an occurrence of an event;
a setting unit configured, in response to an instruction for a Domain Name System ("DNS") usage setting, to enable or disable the DNS usage setting;
an obtaining unit configured to obtain an IP address from a Fully Qualified Domain Name ("FQDN") when the DNS usage setting is enabled;
a determination unit configured to determine whether the notification destination is represented by an IP address or by an FQDN; and
a registering unit configured:
(i) to register the notification destination in response to the DNS usage setting being enabled;
(ii) to register the notification destination in response to the determination unit determining that the notification destination is represented by an IP address; and
(iii) not to register the notification destination in response to the DNS usage setting being disabled and the determination unit determining that the notification destination is represented by an FQDN.

2. The communication apparatus according to claim 1, further comprising a connection unit configured to connect the communication apparatus with a client terminal indicated by the registered notification destination in order to notify the client terminal of the event.

3. The communication apparatus according to claim 1, wherein the communication apparatus is a printer.

4. The communication apparatus according to claim 1, wherein the registering unit is configured to register a plurality of notification destinations in a destination list.

5. A method of controlling a communication apparatus, the method comprising:
receiving a notification destination that is to be notified in response to an occurrence of an event;
enabling or disabling, in response to an instruction for a Domain Name System ("DNS") usage setting, the DNS usage setting, wherein when the DNS usage setting is enabled, an IP address is obtained from a Fully Qualified Domain Name ("FQDN");
determining whether the notification destination is represented by an IP address or by an FQDN;
registering the notification destination in response to the DNS usage setting being enabled;
registering the notification destination in response to determining that the notification destination is represented by an IP address; and
restricting registering of the notification destination in response to the DNS usage setting being disabled and the determining that the notification destination is represented by an FQDN.

6. A non-transitory computer-readable storage medium storing a computer-executable program, the program comprising:
receiving instructions configured to receive a notification destination that is to be notified in response to an occurrence of an event;
setting instructions configured, in response to an instruction for a Domain Name System ("DNS") usage setting, to enable or disable the DNS usage setting;
obtaining instructions configured to obtain an IP address from a Fully Qualified Domain Name ("FQDN") when the DNS usage setting is enabled;
determination instructions configured to determine whether the notification destination is represented by an IP address or by an FQDN; and
registering instructions configured:
(i) to register the notification destination in response to the DNS usage setting being enabled;
(ii) to register the notification destination in response to a determination according to the determination instructions that the notification destination is represented by an IP address; and
(iii) not to register the notification destination in response to the DNS usage setting being disabled and a determination according to the determination instructions that the notification destination is represented by an FQDN.

* * * * *